US009550153B2

(12) United States Patent
Morita et al.

(10) Patent No.: US 9,550,153 B2
(45) Date of Patent: Jan. 24, 2017

(54) POROUS POLYMER FLAT-SHEET MEMBRANE

(71) Applicant: TOYOBO CO., LTD., Osaka-shi, Osaka (JP)

(72) Inventors: Junsuke Morita, Otsu-shi (JP); Masao Higashi, Otsu-shi (JP); Norifumi Shimada, Otsu-shi (JP); Tooru Kitagawa, Otsu-shi (JP)

(73) Assignee: TOYOBO CO., LTD., Osaka-shi (JP)

( * ) Notice: Subject to any disclaimer, the term of this patent is extended or adjusted under 35 U.S.C. 154(b) by 0 days.

(21) Appl. No.: 14/758,414

(22) PCT Filed: Dec. 11, 2013

(86) PCT No.: PCT/JP2013/083207
§ 371 (c)(1),
(2) Date: Jun. 29, 2015

(87) PCT Pub. No.: WO2014/115438
PCT Pub. Date: Jul. 31, 2014

(65) Prior Publication Data
US 2015/0328591 A1 Nov. 19, 2015

(30) Foreign Application Priority Data
Jan. 24, 2013 (JP) ................. 2013-010823

(51) Int. Cl.
*B01D 39/00* (2006.01)
*B01D 39/14* (2006.01)
(Continued)

(52) U.S. Cl.
CPC ........... *B01D 69/06* (2013.01); *B01D 67/0088* (2013.01); *B01D 69/02* (2013.01); *B01D 69/10* (2013.01);
(Continued)

(58) Field of Classification Search
CPC . B01D 2323/02; B01D 71/12; B01D 2323/12; B01D 61/145; B01D 71/68; B01D 2323/04; B01D 61/147; B01D 67/0088; B01D 69/06
See application file for complete search history.

(56) References Cited

U.S. PATENT DOCUMENTS 4,413,074 A * 11/1983 Wrasidlo ........... B01D 67/0088
210/490
4,794,002 A * 12/1988 Henis ................. B01D 67/0088
424/484
(Continued)

FOREIGN PATENT DOCUMENTS

JP 58-88011 A 5/1983
JP 62-176508 A 8/1987
(Continued)

OTHER PUBLICATIONS

Notification of Transmittal of Translation of the International Preliminary Report on Patentability (Form PCT/IB/338) issued in counterpart international Application No. PCT/JP2013/083207 dated Aug. 6, 2015, with Forms PCT/IB/373 and PCT/ISA/237. (7 pages).
(Continued)

*Primary Examiner* — Ana Fortuna
(74) *Attorney, Agent, or Firm* — Westerman, Hattori, Daniels & Adrian, LLP

(57) ABSTRACT

The present invention provides a porous polymer flat-sheet membrane for MBR wherein surface of the porous polymer membrane is kept hydrophilic for a long period and high water permeability and anti-fouling properties are kept. A porous polymer flat-sheet membrane for MBR comprising a hydrophobic porous polymer membrane forming a network structure and a sheet substrate supporting it, characterized in that at least surface of the porous polymer membrane is
(Continued)

coated and fixed with an insolubilized hydroxypropyl cellulose, that a ratio of the hydroxypropyl cellulose to the porous polymer membrane is 0.4 to 1.0% by weight and that, when NMR spectrum of the hydroxypropyl cellulose coated on and fixed to the membrane is measured using a nuclear magnetic resonance apparatus (proton NMR), an intensity ratio (B/A) of a spectral peak (B) appearing at 4.12 ppm to a spectral peak (A) appearing at 3.75 ppm is 12 to 30%.

5 Claims, 4 Drawing Sheets

(51) Int. Cl.
| | | |
|---|---|---|
| *B01D 67/00* | (2006.01) | |
| *B01D 69/06* | (2006.01) | |
| *B01D 69/02* | (2006.01) | |
| *B01D 71/22* | (2006.01) | |
| *C02F 3/12* | (2006.01) | |
| *B01D 69/10* | (2006.01) | |
| *B01D 69/12* | (2006.01) | |
| *B01D 71/12* | (2006.01) | |
| *B01D 71/30* | (2006.01) | |
| *B01D 61/14* | (2006.01) | |

(52) U.S. Cl.
CPC .............. *B01D 69/12* (2013.01); *B01D 71/12* (2013.01); *B01D 71/22* (2013.01); *B01D 71/30* (2013.01); *C02F 3/1268* (2013.01); *B01D 61/145* (2013.01); *B01D 61/147* (2013.01); *B01D 2311/2688* (2013.01); *B01D 2323/02* (2013.01); *B01D 2323/04* (2013.01); *B01D 2323/08* (2013.01); *B01D 2323/22* (2013.01); *B01D 2323/46* (2013.01); *B01D 2325/028* (2013.01); *B01D 2325/24* (2013.01); *B01D 2325/28* (2013.01); *B01D 2325/36* (2013.01); *B01D 2325/38* (2013.01)

(56) References Cited

U.S. PATENT DOCUMENTS

| | | | | |
|---|---|---|---|---|
| 5,019,261 | A * | 5/1991 | Stengaard | B01D 67/0088 210/490 |
| 5,228,994 | A * | 7/1993 | Tkacik | B01D 69/12 210/500.29 |
| 5,980,746 | A | 11/1999 | Gelman et al. | |
| 6,056,903 | A * | 5/2000 | Greenwood | B01D 67/0011 210/500.41 |
| 6,214,382 | B1 * | 4/2001 | Eguchi | B01D 67/0088 424/402 |
| 6,565,748 | B1 | 5/2003 | Wang et al. | |
| 7,981,500 | B2 * | 7/2011 | Yonemoto | B32B 5/30 156/185 |
| 2007/0084788 | A1 * | 4/2007 | Moya | A61L 2/0017 210/500.29 |
| 2008/0245736 | A1 * | 10/2008 | Charkoudian | B01D 67/0093 210/650 |
| 2010/0224555 | A1 * | 9/2010 | Hoek | B01D 67/0088 210/500.42 |

FOREIGN PATENT DOCUMENTS

| | | |
|---|---|---|
| JP | 9-75694 A | 3/1997 |
| JP | 2000-515062 A | 11/2000 |
| JP | 2001-504227 A | 3/2001 |
| JP | 2003-144869 A | 5/2003 |
| JP | 2003-251152 A | 9/2003 |
| JP | 2006-205067 A | 8/2006 |
| JP | 2007-136449 A | 6/2007 |
| JP | 4395904 B2 | 1/2010 |
| JP | 4504963 B2 | 7/2010 |
| WO | 2013/022016 A1 | 2/2013 |

OTHER PUBLICATIONS

Werbowyj et al., "Ordered Phase Formation in Concentrated Hydroxypropylcellulose Solutions" Macromolecules, 1980, vol. 13, pp. 69-73; cited in the Office Action of corresponding application No. JP2013-010823.

International Search Report dated Feb. 10, 2014 issued in corresponding application No. PCT/JP2013/083207.

* cited by examiner

1: before forming hydrogen bonds
2: bonds between side chains
3: bonds between a side chain and a main chain a: energy barrier to be overcome for forming hydrogen bonds between side chains
b: energy barrier to be overcome for forming hydrogen bonds between a side chain and a main chain

POROUS POLYMER FLAT-SHEET MEMBRANE

TECHNICAL FIELD OF THE INVENTION

The present invention relates to a porous polymer flat-sheet membrane which is used for a membrane bioreactor (MBR) and retains high water permeability and anti-fouling properties even if being used for a long period.

BACKGROUND ART

In recent years, quality and quantity necessary for the water for daily use and for the water for industrial use have been enhanced based on the background of the worldwide population growth, industrialization, urbanization and improvement in living standard.

For maintaining the water resources in general, there is a method wherein freshwater is prepared from sea water utilizing an evaporation method or a reverse osmosis (RO) method, a method wherein fresh water is prepared from salt-containing brine utilizing a reverse osmotic phenomenon, etc. in addition to the conventionally conducted utilization of natural water obtained from the nature. However, it has been said that resources for fresh water existing in nature are limited and further that possibility of its utilization tends to become narrower due to the affection by abnormal weather in recent years. In addition, energy for heating or pressurization is necessary for the preparation of fresh water by means of an evaporation method or reverse osmosis whereby only limited region can utilize such a means.

As another method therefor, there is a course of action wherein sewage is recycled. In the conventional sewage treatment, organic components in sewage are subjected to a decomposing treatment using activated sludge followed by subjecting to sedimentation, filtration, etc. and the treated water is discharged although it has been difficult to completely remove the bacterial group such as *Escherichia coli*. In MBR, the water treated with activated sludge is filtered using a separating membrane. Accordingly, in MBR, the above noxious bacterial group can be completely removed and there are also many advantages such as compactness of the equipment and easy control of the operation whereby MBR has become the technology receiving much public attention in recent years. Water separated by means of MBR is not only utilizable as the water for maintaining the life and the landscape and also as the non-potable water but also can give tap water when combined with a reverse osmosis method. In a reverse osmosis method using sea water, high pressure coping with the salt concentration is necessary. When the treated water prepared by MBR is utilized as raw water, it is now possible to prepare the water safely and also with low energy.

As such, MBR has been receiving public attention as a method for solving the water shortage which is believed to happen in future. In order to further improve this method and to establish as a highly efficient system at low cost, it is necessary to retain the separation properties of the membrane and, at the same time, to secure the water permeation properties. Characteristics which are generally demanded for a membrane to be used in MBR will be shown below.

Firstly, since a bare membrane is used by immersing in activated sludge in the MBR, its using manner is rough as compared with separation membranes in other technical fields. Therefore, physical strength resisting to the use is demanded. To be more specific, high strength and hardly-elongating membrane properties are necessary so as not to result in breakage and deformation of the membrane and lowering of the properties even when the membrane is shocked by various contaminants in the activated sludge or the trans-membrane pressure (TMP) increases by filtration.

In addition, when the membrane is used for a long period in the state of being immersed inactivated sludge, pores of the membrane are clogged by secretions generated by the activated sludge or dead bodies thereof per se, by the contaminants contained in the sludge, etc. whereby the water permeation properties lower or the pump pressure is to be raised for coping therewith. That is the biggest problem in the use of a membrane called fouling. Against this problem, there is conducted such an operation that the membrane is washed using the chemicals such as sodium hypochlorite and hydrochloric acid to solve the problem of fouling whereby the membrane is returned to a fresh state. Accordingly, it is also important that the membrane has the resistance to a solution of chemicals so that the membrane is not deteriorated by those chemicals.

However, in a washing operation using those chemicals, there are many problems in terms of economy and environment such as a stop of filtering work during the operation, cost for chemicals, troublesomeness of the work, treatment of waste liquid of chemicals, etc. Accordingly, it is the biggest matter to solve how to prevent the fouling and how to make the usable period longer so as to make the washing operation by chemicals minimum.

With regard to a method for suppressing the fouling, investigations have been eagerly carried out already. Examples of the effective method are to control the membrane structure (particularly, to control the pore size and distribution thereof) and to make the membrane hydrophilic. When the pore size has variations, there are always some pores which are easily clogged whereby it is believed that the fouling quickly proceeds from such pores. In addition, when pore size on the membrane surface is too small or when opening degree is low, sucking pressure per pore becomes high whereby the possibility of clogging is believed to become high. Another method (i.e. to make the membrane hydrophilic) is explained below. Generally, many of the substances causing the fouling (foulants) are hydrophobic. When the separating membrane is hydrophobic, the foulants are apt to be adsorbed with the membrane surface due to a hydrophobic interaction whereby it is believed that the fouling easily happens and the progress thereof is also quick.

In addition, an important point in the practical use of the membrane is that the hydrophilicity continues as long as possible. As a result thereof, it is possible to save troublesomeness and cost for making the membrane hydrophilic once again after the used membrane is washed and dried. At the same time, the anti-fouling effect continues for long time even in the actual use whereby it is possible to contribute to conservation of energy and reduction of cost.

As to the membrane for MBR taking the problem of water permeability and hydrophilization as such into consideration, there has been proposed a membrane which uses a resin of a chlorinated polyvinyl chloride (CPVC) or polyvinylidene fluoride (PVDF) type as a membrane material (for example, see Patent Documents 1 and 2). To be more specific, in the patent document 1, CPVC is dissolved in tetrahydrofuran (THF), then isopropyl alcohol (IPA, or 2-propanol) and sucrose ester are further added thereto and a nonwoven fabric of polyester is impregnated with in the above-prepared solution and dried to conduct a phase separation whereupon a microporous product is formed. Further, in the patent document 2, a solution for preparing a membrane containing PVDF having excellent resistance to chemicals, a graft copolymer of methyl polymethacrylate with polyvinylpyrrolidone, N,N-dimethylacetamide and polyvinyl alcohol was prepared, applied onto a nonwoven fabric of polyester and immersed in an aqueous coagulating bath so as to prepare a porous substrate wherein porous resin layers are formed thereon.

However, in the above membrane using the conventional CPVC, it cannot be said that pore size and distribution thereof are optimized. (Various problems pointed out in the above paragraph are worried about.) In addition, there is a problem in the hydrophilizing degree or, particularly, in retaining the hydrophilicity when used for a long period. On the other hand, when materials being resistant to chemicals other than CPVC are used, there is a limitation in a method for the preparation of membrane and it is substantially impossible to prepare a membrane by a dry method which requires little investment in plant and equipment and which allows easy preparation of membrane. For example, although the flat membrane of a PVDF resin is excellent in terms of the resistance to chemicals and of the micropore density, it is prepared by a wet method or by a thermally induced phase separation method in view of the selection of solvents and non-solvents. In a wet method, skin layers and microvoids are apt to be formed on the surface and in the inner area, respectively, of a membrane whereby it is difficult to give a product having sufficient properties and strength. In a thermally induced phase separation method, since membrane pores are formed by the changes in temperature, a strict temperature control is necessary whereby investment in plant and equipment is big and disaster risk due to the operation under high temperature is also high. Moreover, cost for polymers is high as compared with a vinyl chloride resin whereby the production cost becomes high in an industrial scale.

As to an example using other hydrophilizing agents, there has been proposed a method using cellulose into which a hydrophobic group is introduced or using hydroxypropyl methyl cellulose (HPMC) into which a hydrophobic group is introduced (see Patent Document 3). To be more specific, PVC or CPVC is dissolved in THF, then the above-mentioned cellulose derivative and a non-solvent such as IPA are added and a nonwoven fabric is immersed in the above-prepared solution and dried to conduct a phase separation whereby a microporous product is formed. According to this method, since a hydrophilizing agent is just dispersed in the membrane components, the hydrophilizing agent is apt to be eluted during a membrane washing conducted in the actual use or, particularly, during a membrane washing using chemicals whereby the effect is little in view of retention of hydrophilicity. Moreover, in the patent document 3, it is necessary to use a hydrophilizing agent in an amount of at least 3% by weight to the resin materials whereby the cost becomes high.

As an example for fixing a hydrophilizing agent on a membrane surface, there has been proposed a method wherein hydroxyalkyl cellulose is fixed on a hydrophobic ultrafiltration membrane (for example, see Patent Document 4). To be more specific, an ultrafiltration membrane formed of a sulfonic polymer is immersed in an alcoholic solution containing hydroxyalkyl cellulose and, after that, it is subjected to a treatment with an autoclave in the presence of steam or water and to a treatment containing immersion in boiling water. In this method, it is probable that thermal deformation of hydroxyalkyl cellulose is too much promoted by high temperature to lower the hydrophilic effect as will be mentioned later and the hydrophilic characteristic inherent to hydroxyalkyl cellulose cannot be fully achieved. In addition, since provision of the steps for an autoclave treatment and a boiling water treatment results in much more energy consumption, it is not a good method in view of conservation of energy and cost and, moreover, there is also a possibility that the apparatus and the steps are compelled to become complicated.

As an example of a method for modifying surfaces of various polymeric support materials, there has been proposed a method wherein a hydrophilic polymer is irreversibly adsorbed with surfaces of hydrophobic membrane (for example, see Patent Document 5). To be more specific, a polysulfone (PSf) membrane is immersed in a deionized solution of hydroxypropyl cellulose (HPC) for 16 hours and, after that, it is washed with deionized water for 16 hours. In this method, neither insolubilizing treatment nor preferred thermal denaturation for fixing the HPC to the surface of hydrophobic membrane is conducted as will be mentioned later. Accordingly, the HPC does not remain on the membrane surface but is eluted during washing.

For a purpose of imparting resistance to high-temperature sterilization such as steam sterilization, there has been disclosed an example of porous membrane which is formed of HPC and polyether sulfone (PES) and which can be spontaneously moistened (for example, see Patent Document 6). To be more specific, HPC is applied to a porous membrane formed of PES and, after that, a steam sterilization treatment is conducted. In this example, thermal denaturation of HPC is too much promoted by high temperature and there is a possibility that the hydrophilic effect lowers whereby the hydrophilic characteristic inherent to HPC cannot be fully achieved the same as in the case of the patent document 4 as will be mentioned later.

For a purpose of preventing lowering of filtering speed and clogging of a hydrophobic membrane filter, there has been proposed an example wherein a cellulose derivative is adsorbed with the membrane surface so as to modify a hydrophobic membrane to a hydrophilic one (for example, see Patent Document 7). To be more specific, a hydrophobic membrane of an aromatic polymer type is impregnated with a solution of a hydrophilic cellulose derivative at the temperature which is lower than 10° C. or more from a gelling temperature or a clouding temperature and, after that, it is washed with water at the temperature which is not lower than 20° C. or more from a gelling temperature or a clouding temperature of the solution. The content of the Patent Document 7 merely teaches that, for preventing the clogging of the membrane, HPC is subjected to a hydrophilizing treatment at the temperature which is lower than the gelling or clouding temperature of HPC.

PRIOR ART DOCUMENTS

Patent Documents

Patent Document 1: Japanese Patent Application Laid-Open (JP-A) No. 88011/83
Patent Document 2: Japanese Patent Application Laid-Open (JP-A) No. 2006-205067
Patent Document 3: Japanese Patent (JP-B) No. 4395904
Patent Document 4: Japanese Patent (JP-B) No. 4504963
Patent Document 5: Japanese Patent Application Laid-Open (JP-A) No. 176508/87
Patent Document 6: Japanese Patent Application Laid-Open (JP-A) No. 2003-251152

Patent Document 7: Japanese Patent Application Laid-Open (JP-A) No. 75694/97

DISCLOSURE OF THE INVENTION

Problem that the Invention is to Solve

The present invention has been conducted for overcoming the above-mentioned problems in the prior art. The object of the present invention is to provide a porous polymer flat-sheet membrane for MBR having high strength wherein surfaces of the porous polymer membrane are kept hydrophilic for a long period and high water permeability and anti-fouling properties are kept for a long period.

Means for Solving the Problem

The present inventors have eagerly investigated for achieving the above object and, as a result, they have selected the membrane substrate and the membrane material having the strength durable for a long-term use and they have succeeded in expressing the membrane surface characteristic wherein sludge is hardly adhered thereto in spite of having an excellent membrane structure. To be more specific, they have found that, when insolubilized HPC in a predetermined amount is coated on and fixed to a porous polymer membrane for MBR using a hydrophobic polymer, it is now possible to provide a porous polymer flat-sheet membrane for MBR wherein high water permeability and anti-fouling properties can be kept for a long period whereupon they have achieved the present invention.

Thus, the present invention has the following constitutions of (1) to (5).

(1) A porous polymer flat-sheet membrane for MBR comprising a hydrophobic porous polymer membrane forming a network structure and a sheet substrate supporting it, characterized in that at least surfaces of the porous polymer membrane are coated and fixed with an insolubilized hydroxypropyl cellulose, that a ratio of the hydroxypropyl cellulose to the flat-sheet membrane is 0.4 to 1.0% by weight and that, when NMR spectrum of the hydroxypropyl cellulose coated on and fixed to the membrane is measured using a nuclear magnetic resonance apparatus (proton NMR), an intensity ratio (B/A) of a spectral peak (B) appearing at 4.12 ppm to a spectral peak (A) appearing at 3.75 ppm is 12 to 30%.

(2) The flat-sheet membrane according to (1), wherein a filter flow in a dry state is 30 to 60 L/min when a pressure is 150 kPa.

(3) The flat-sheet membrane according to (1) or (2), wherein average pore size of the flat-sheet membrane when measured by a perm porometer is 0.2 to 0.5 μm.

(4) The flat-sheet membrane according to any of (1) to (3), wherein pure water flux is 15 to 50 mL/cm$^2$/min/bar and bubble point is 0.08 to 0.3 MPa.

(5) A method for producing the flat-sheet membrane mentioned in any of (1) to (4), characterized in that, a sheet substrate is impregnated with a membrane-preparation solution containing hydrophobic polymer, solvent and non-solvent followed by drying to form a sheet wherein a porous polymer membrane is formed on and in the sheet substrate, then the resulting sheet is successively put into a tank containing hydroxypropyl cellulose (impregnating step), a water washing tank (water washing step) and a hot water tank of 50 to 72° C. (fixing step) followed by drying (drying step) and a time for putting into the hot water tank of 50 to 72° C. is 50 to 75 minutes.

Advantages of the Invention

In the flat-sheet membrane of the present invention, its membrane material has a strength being durable for a long-term use and the membrane structure (structure of cross section of the membrane, etc.) is controlled whereby the membrane properties such as water permeability are very high. In addition, since insolubilized HPC is used as a hydrophilizing agent, a high hydrophilizing effect is achieved. Moreover, since a treatment is conducted at the temperature by which fixation of the HPC is done to the above membrane material, it is possible to express a high anti-fouling properties and also to express the duration thereof.

BRIEF DESCRIPTION OF THE DRAWINGS

FIG. 1 (b) shows an SEM photograph of the surface of the membrane of Example 1 in 5,000 magnifications.

BEST MODE FOR CARRYING OUT THE INVENTION

Figure 1:
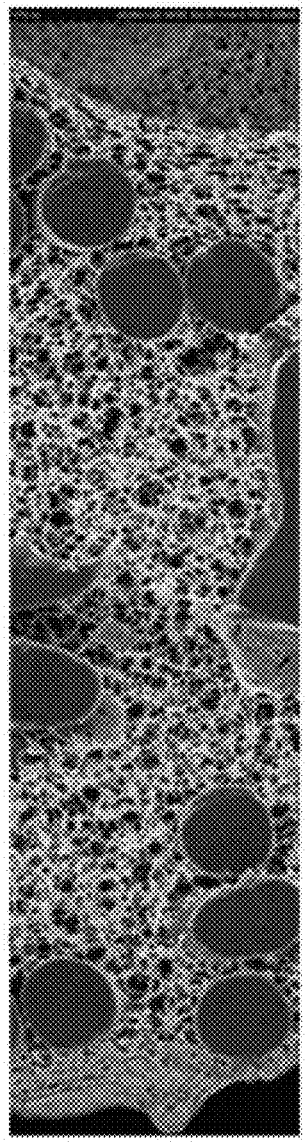
FIG. 1 (a) shows an enlarged photograph of the cross section of the membrane of Example 1 using a scanning electron microscope (SEM).
Figure 1:
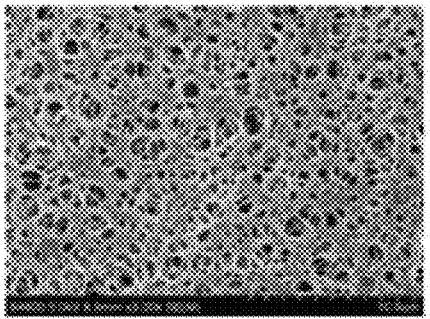

Hereinafter, the porous polymer flat-sheet membrane of the present invention will be illustrated. The flat-sheet membrane of the present invention is characterized in that insolubilized HPC is coated on and fixed to a membrane to be used for MBR using a hydrophobic polymer whereby high water permeability and anti-fouling properties can be retained even when used for a long term.

The flat-sheet membrane of the present invention is used for MBR wherein the sheet is immersed in activated sludge for obtaining a clear filtrate from an activated sludge solution. In an MBR method, wastewater is introduced into activated sludge, water contaminants mainly comprising organic substances in the wastewater are trapped by activated sludge, in which microbes have abundantly grown in the reaction tank and then they are consumed by metabolism or respiration of the microbes or are discharged as sludge in a trapped state. As a result thereof, the organic substances in the wastewater are decomposed by the activated sludge and, on the other hand, filtration is conducted using a membrane and only clean water is taken out.

When clean water is separated from the activated sludge, the separation has been conventionally conducted by a precipitation method. In this method, long time is needed for the separation whereby it is inevitable to provide a settling pond requiring a broad area. In addition, since water is treated by passing through a sand filter of the settling pond, it is impossible to avoid a risk wherein bacteria such as *Escherichia coli* and sludge components contained in the active sludge are contaminated in the treating water. On the other hand, in an MBR method using a separation membrane, an almost perfect separation into solid and liquid according to the pore size of the membrane is possible whereby the above risk can be significantly reduced. In addition, a settling pond can be also eliminated. Accordingly, it greatly contributes to making the treating equipment and facilities compact and in saving the space. However, as mentioned already, fouling which is the biggest problem is generated by the use of a membrane. Fouling stands for a phenomenon wherein, together with the progress of the use, metabolites and dead bodies of bacteria as well as saccharides and polypeptides which are the metabolites adhered to the surface of the membrane whereby the membrane is clogged. If a membrane which is highly resistant to the fouling is obtained in the MBR, it makes the control of the equipments-easier and greatly contributes to enhancement of the treating ability and in lowering the cost. As mentioned already, the porous membrane according to the present invention has succeeded in reducing the fouling which is a problem in the use of a membrane in MBR and also in enhancing the membrane properties such as water permeability.

The porous membrane according to the present invention is constituted by composing a membrane substrate in a sheet form with a membrane material comprising a hydrophobic polymer material forming a network structure. The membrane substrate not only keeps the shape of the membrane by supporting the membrane material but also plays a role of absorbing the stress applied to the membrane. In the polymer material constituting the membrane material, an appropriate porous structure is formed by an appropriate entanglement with the membrane substrate whereby it is possible to impart the function as a separating membrane.

The membrane substrate is preferred to be constituted from a nonwoven fabric formed of a polymer material which is not soluble in organic solvents and water. There is no particular limitation therefor provided that it exhibits the ability for retaining the membrane components and for retaining the stress applied to the membrane. The nonwoven fabric is preferred to be composed of a polymer of a hydrocarbon type, an olefin type or a condensation-polymerized type and is constituted, for example, from polyethylene, polyolefin, polyvinyl alcohol, polyethylene terephthalate, nylon, polyimide, polytetrafluoroethylene, PVC and the like.

Thickness of the nonwoven fabric is preferably 80 to 150 μm. Since the nonwoven fabric is used as a water-permeating membrane substrate, there is a risk of inhibiting the permeation of water if it is too thick. On the other hand, if it is too thin, the strength is not sufficient and there is a risk that it is not durable for a long-term use.

For ensuring the strength of a nonwoven fabric, a method wherein fibers are fixed each other using a binder has been known. The fixing method may be any of a method using a fiber of a core/sheath type in which a binder component is formed in a sheath part, a method wherein a nonwoven fabric is prepared followed by impregnating an adhesive component therewith, etc. A preferable method is a method wherein a nonwoven fabric is prepared together with a binder fiber followed by adhering by heat so that fibers are connected. After a nonwoven fabric is prepared by appropriately combining a drawn thread with an un-drawn thread, temperature and pressure are applied. At that time, since the un-drawn thread softens at lower temperature than the drawn thread, it plays a role of a binder. A method wherein the strength is kept by means of embossing has been also known but, when the embossed part forms in a membrane, there is a risk that it may cause a defect.

As a method for preparing the nonwoven fabric, there are many methods such as a melt-blow method, a thermal bond method and a paper manufacturing method and any of them may be used. However, fiber diameter and basis weight are important in view of securing the water permeability. Fiber diameter is preferred to be 5 to 12 μm and more preferred to be 7 to 10 μm. When the fiber diameter is too small, the strength becomes small and the product is not durable for a long-term use while, when it is too large, the balance as a whole becomes small and strength cannot be fully kept whereby there is also a risk of being un-durable for a long-term use. When fiber diameter is too big as compared with the membrane thickness, a nonwoven fabric becomes a coarse structure as a whole and, as a result, polymer components constituting the membrane are not sufficiently kept in the nonwoven fabric or there is a possibility that the amount of polymer to be filled becomes insufficient generating the voids in the membrane. Basis weight per 1 μm thickness is preferred to be 0.4 to 0.8 $g/m^2$ and more preferred to be 0.5 to 0.7 $g/m^2$. The less the basis weight, the better but, when it is too small, strength becomes small whereby the membrane is not durable for a long-term use while, when it is too large, voids become small and there is a risk of inferior permeability.

When a nonwoven fabric is applied with force, it is elastically deformed in the initial stage and, when the force is reduced, the nonwoven fabric returns to its initial state but, if the force is further applied beyond a critical point to cause deformation, the nonwoven fabric no longer returns to the original state even if the force is reduced. The former is called an elastic deformation while the latter is called a plastic deformation. The above point is called a yield point and the force is called a yield strength while the elongation is called a yield elongation. A nonwoven fabric is a material which supports the membrane. The strength and elongation characteristics thereof are important ones for governing the membrane strength. As will be mentioned later, the yield strength of the membrane of the present invention including a nonwoven fabric is preferred to be 15 to 50 N per 15 mm of the width in both longitudinal and transverse directions. When the yield strength is low, the plastic deformation is immediately resulted when force is applied to the membrane without returning to the original state whereby the yield strength is preferred to be high. However, when it is too high, it is difficult from technical viewpoint to prepare a less expensive nonwoven fabric which can keep the water permeability. Accordingly, the yield strength of the nonwoven fabric is preferred to be 15 to 50 N per 15 mm width in both longitudinal and transverse directions. When the yield elongation is too big, elongation of the nonwoven fabric and the membrane becomes big whereby a risk of breakage of network when a membrane is formed becomes high. Further, the membrane becomes to be a deformed state due to water pressure and pressure during filtration and there is a risk that the water permeability is not sufficient. When no elongation takes place at all, there is a possibility that the impact applied to the membrane cannot be absorbed but breakage happens.

Accordingly, the yield elongation of a nonwoven fabric is preferred to be 1 to 3%. Incidentally, the lengthwise direction of the resulting sheet is defined as a longitudinal direction.

On the other hand, a membrane material is constituted from a hydrophobic polymer material and a network structure having pores in a submicron size is formed by a phase separation method. Although there is no particular limitation for the selection of a polymer material, PVC and/or CPVC are/is preferred. The reason why the polymer(s) as such is/are used is that it/they show(s) resistance to chemicals, strength and stability in levels having no problem in its actual use and that it/they has/have very good balance with the material cost. In the use of the membrane of the present invention, there are demanded the strength characteristic being durable to sucking pressure in use and to sponge washing upon washing, the chemical-resisting characteristic being durable to the treatment with sodium hypochlorite and with acid- and alkali-type chemicals and the stability without decomposition, deformation and breakage even by a long-term use. As mentioned in the background art already, materials having those characteristics are limited and, in such a view that the cost is low and that no complicated manufacturing equipment is demanded, PVC and/or CPVC are/is quite excellent.

As to the phase separation, there have been known a method (dry method) wherein a solution is prepared by mixing a polymer material with a solvent, applied to a nonwoven fabric substrate and dried in the air, a method (wet method) wherein coagulation is conducted by introducing into a coagulating bath, a method (thermally induced phase separation method) wherein the temperature is quickly changed, etc. Although any of those methods may be used, a dry method wherein a substrate applied with a polymer solution is dried in a gas phase is preferred in such a respect that control in the preparation of the membrane is easy and that no complicated equipment is necessary.

As to a solvent which dissolves the polymer material, it is necessary that the solvent dissolves the polymer constituting the membrane but does not dissolve the nonwoven fabric. It is possible to use a solvent which is evaporated at about 150° C. or lower or is soluble in water. To be more specific, tetrahydrofuran (THF), toluene, dimethylformamide (DMF), N-methyl-2-pyrrolidone (NMP) and dimethylacetamide (DMAC) are appropriate and each of them may be used solely or two or more thereof may be mixed. When a membrane is prepared by a dry method, the solvent is evaporated in a gas phase to form a membrane. Accordingly, it is preferred to use THF or a mixed solvent containing THF as a main ingredient (50% by weight or more).

As to a non-solvent, water or alcohol is suitable. Among the alcohol, the particularly preferred ones are ethanol (EtOH), propanol (1- or 2-propanol, IPA) and butanol (1- or 2-butanol, BuOH). Each of them may be used solely or two or more thereof may be mixed.

Concentration of the polymer in the solution is preferred to be 5 to 20% by weight. When the concentration of the polymer is too low, a network structure of the membrane does not grow sufficiently and the membrane part itself is not durable for a long-term use. When the concentration is too high, the solution does not permeate into the inner area of a nonwoven fabric and there is a risk that the function as a membrane is not achieved. A ratio of the solvent to the non-solvent (solvent/non-solvent) is preferred to be 1 to 3. When the ratio of the non-solvent is too high, dissolving ability for the polymer is deteriorated whereby no homogeneous solution can be prepared and there is a risk that no sufficient impregnation is achieved. When it is too low, there is a risk that a role of promoting the phase separation cannot be achieved.

A polymer material constituting the membrane is hydrophobic. Therefore, it is difficult to flow the water in the initial stage of using the membrane. Moreover, a problem of the so-called fouling wherein, due to hydrophobic interaction, metabolic components, saccharides, dead bodies, etc. produced by bacteria in activated sludge during the use are adsorbed with the membrane whereby the membrane is clogged is apt to happen. As one of the methods for avoiding the above problem, it is preferred to make the membrane hydrophilic.

As to a general treating method for hydrophilization, examples thereof include a method wherein a hydrophilizing agent is added to a polymer solution, a method wherein a hydrophilizing agent is added after a membrane preparation, a method wherein a surface treatment is conducted to a membrane, etc. Examples of the preferred ones among the above include a method wherein a hydrophilizing agent is added after a membrane preparation, a method wherein a surface treatment is conducted to a membrane, etc. A hydrophilizing agent is a chemical substance having both a hydrophobic part and a hydrophilic part in a molecule and has a function of fixing to a membrane surface or to an inner network. Examples thereof include saccharides, cellulose derivatives, surfactants, etc. To be more specific, sucrose fatty acid ester, HPC, sodium lauryl sulfate, etc. may be exemplified. An example of a method wherein hydrophilization is applied after a membrane preparation, is a method wherein a membrane is immersed in a solution comprising the above hydrophilizing agent and fixation is conducted by applying the temperature or by drying. Although the control is difficult, it is also possible that the membrane itself is sulfonated by a direct method or a sulfate group is attached thereto. There is also a method wherein electronic ray, plasma, gamma ray, ultraviolet ray or the like is irradiated to oxidize the whole membrane or the membrane surface whereby carboxylic acid is imparted thereto. A method wherein a hydrophilizing agent is cross-linked in an after-treatment or graftization is conducted is also effective in view of keeping the hydrophilizing effect.

Although various methods may be adopted for making the membrane hydrophilic as mentioned hereinabove, it is suitable in view of reducing the cost that HPC is coated on and fixed to the membrane. In view of anti-fouling to the actual wastewater, coating and fixing of hydroxypropyl cellulose thereon and thereto is suitable as well. In the present invention, although the type and the characteristic of the HPC used therefor are not limited, HPC-L manufactured by Nippon Soda is selected particularly in view of easiness in the preparation of an HPC solution used for coating the membrane, easiness in control of solution viscosity and maintenance/upkeep and balance between anti-fouling properties and water permeation properties. In accordance with the standard values of Nippon Soda for HPC-L, the viscosity of a solution of 2% HPC concentration at 20° C. is within a range of 6.0 to 10.0 mPa·s and the hydroxypropoxy group is within a range of 53.4 to 77.5%.

Hereunder, an example of a method for preparing a porous polymer flat-sheet membrane according to the present invention will be mentioned. Firstly, a nonwoven fabric is impregnated with a solution wherein a polymer for forming a membrane is dissolved. As to a method for impregnation, any of an immersion method, impregnation using a die, etc. may be used.

After the nonwoven fabric is impregnated with the polymer solution, it is introduced to a drying zone for evaporating the solvent. At that time, it is preferred to pay careful attention so that the wind does not directly hit the membrane. This is because, if the wind directly hits the membrane, renewal of gas in the vicinity of the membrane surface is promoted and the phase separation quickly takes place on and near the membrane surface (such an area will be referred to as "surface layer") whereby the structure of the membrane surface layer becomes dense and there is a risk of lowering of water permeability. As a result of eager investigation of the present inventors, it has been found that the anti-fouling properties of the membrane wherein the structure of membrane surface layers becomes dense as such are poor as well.

In the drying zone, the control of temperature and humidity is important. Preferred temperature is 10 to 40° C. When the temperature is too high, drying from the membrane surface is promoted and the phase separation on the membrane surface proceeds quickly whereby there is a risk that the structure of the membrane surface layer becomes dense. When the temperature is too low, dew is generated on the membrane surface and the control of the phase separation mechanism of the membrane becomes difficult. Preferred relative humidity is 40 to 85%. When the humidity is too low, the phase separation on the membrane surface layer proceeds quickly whereby there is a risk that the structure of the membrane surface layer becomes dense, and that the membrane structure suitable for the present use cannot be secured. When the humidity is too high, pore size distribution of pores on the membrane surface becomes large whereby there is a possibility that the bubble point (B. P.) lowers and the fractionation properties are deteriorated and there is also a risk that dew is generated on the membrane surface. It is also preferred to control the temperature of the polymer solution used for the immersion. Preferably, it is adjusted to be within −15° C. to +15° C. to the temperature of the drying zone whereby it is possible to prepare a preferable membrane.

In the above membrane preparation by the drying method, it is also necessary for making the preferable membrane structure and pore size that a solvent and a non-solvent having suitable vapor pressures are combined and used. As to the solvent, THF or a mixed solvent comprising THF as a main component (50% by weight or more) may be selected. As to the non-solvent, IPA, butanol or a mixed solvent thereof may be selected. Preferably, a mixed solvent comprising two types of non-solvents which are IPA and 1-butanol may be used. As a result of an eager investigation of the present inventors, it has been found that, when a mixed solvent comprising the both, it is now possible to make the preferable membrane structure, pore size, water permeability and B. P. at the same time. In the present invention, properties which are the target of the present invention can be achieved when the above two types of non-solvents are used. The ratio of 1-butanol in the non-solvents is preferred to be 20 to 80% by weight to the amount of the total non-solvents (total weight of IPA and 1-butanol).

The porous polymer membrane prepared by the above method is subjected to the steps of impregnating, fixing and drying, which will be mentioned below whereby hydrophilization of the membrane can be achieved. As hereunder, a hydrophilizing method of the present invention and the structural characteristics of the resulting membrane will be illustrated in detail.

HPC has such properties that, when its aqueous solution is heated at the temperature of 50° C. or higher, it becomes insoluble in water. HPC is heated at the predetermined temperature to make it insoluble in the hydrophilization of the membrane utilizing the above properties whereupon it is fixed to the polymer which constitutes the membrane. When the treatment is conducted at the temperature of lower than 50° C., it is not possible to conduct an insolubilizing treatment for HPC and, as a result, fixation to the membrane becomes difficult. In that case, it may happen that, during the washing or the actual use of the flat-sheet membrane, HPC is dissolved in water and the coating ratio of HPC to the membrane lowers whereby there is a risk that the hydrophilicity lowers or is apt to be lost. This also can be seen from the fact that the increase rate of trans-membrane pressure difference by filtration/suction in the actual liquid test or in the actual use becomes high. On the other hand, when the heating treatment is conducted at the temperature of higher than 72° C., the anti-fouling properties of the resulting membrane significantly lower in the filtration test using the actual liquid. This is because, when the heating temperature is too high, thermal denaturation of HPC is too much promoted as will be mentioned later whereby the inherent characteristics such as hydrophilicity cannot be fully achieved. Preferred range of the treating temperature is 50° C. to 72° C.

Properties of the membrane also change depending upon the time for the heating treatment. Preferred treating time is 5 minutes to 75 minutes, and more preferred range is 5 minutes to 60 minutes. When the treating time is too short, HPC cannot be fully fixed to the membrane and that is not preferred. When the treating time is long, the thermal denaturation of HPC is too much promoted as will be mentioned later. That is not preferred because the inherent characteristic such as hydrophilicity cannot be fully achieved and also in view of industrial productivity.

Here, in the present invention, when an alcohol is dissolved in this aqueous HPC solution in more than the predetermined amount (for example, in 60% by weight in the liquid composition), HPC is not insolubilized even when the solution is heated at the temperature of 50° C. or higher but the solution keeps its transparency. This phenomenon shows that, when alcohol is present, HPC is neither aggregated nor insolubilized even upon heating (a fixing step) or that alcohol has an effect of dispersing the HPC in a solution. By utilizing these properties, HPC is uniformly dispersed and fixed on the membrane surface so that the hydrophilization is effectively achieved. Firstly, a porous polymer membrane is immersed in a hydrophilizing impregnation solution comprising HPC, alcohol (preferably methanol, ethanol or IPA, and more preferably IPA) and water (an impregnating step) so that an aqueous alcohol solution consisting of HPC is broadly dispersed in micropores of the membrane. After that, insolubilization is conducted by heating at the predetermined temperature using hot water and fixation to the polymer constituting the membrane is conducted (fixing step).

An impregnating step will be illustrated. The porous polymer membrane prepared as above is introduced to an impregnating step and an impregnation solution for giving the hydrophilicity is imparted. As to the impregnation solution, it is preferred to use an aqueous alcohol solution in which HPC is uniformly dissolved within a range of 0.4% by weight to 1.0% by weight. Depending upon the characteristics of the porous membrane used, the ratio of alcohol to pure water and the dissolved amount of HPC may be modified. As to a method for giving the solution to the porous membrane, examples thereof include a method wherein the aqueous solution is used as an impregnation solution and the porous membrane is immersed therein and a method wherein NzB (nozzle block) and Nz (nozzle) pieces are separately applied to the porous membrane. The impregnation method is the simplest and is preferred in view of the cost as well. It is also possible to conduct a step wherein, after the porous membrane is immersed in the impregnation solution, excessive solution is removed using a scraping spatula or a roller bar.

After the impregnating step, it is also possible that, if necessary, the porous polymer membrane is immersed in a washing tank for short time to wash with water. The immersion time is preferred to be 3 seconds or shorter. When the immersion time is longer than 3 seconds, the impregnation solution is pulled back onto the outermost surface of the porous membrane and, as a result, coagulation of HPC is resulted on the outermost surface of the porous membrane in the fixing step whereupon there is a possibility of causing a problem such as clogging of the pores. Further, when washing with water is conducted for significantly long time, there is a risk that the HPC before the fixation is washed out.

The fixing step will be illustrated. In this step, a heating treatment is conducted in order to make the HPC insoluble and also to fix to the porous polymer membrane. In this heating treatment, although a means therefor is not limited to hot water, hot wind and infrared ray irradiation for example, a heating treatment using hot water is preferred since it is at low cost and simple and also can uniformly treat the whole membrane including the area inside the membrane. As mentioned already, temperature for the heating treatment is preferred to be 50° C. to 72° C. As mentioned already, time for the heating treatment is preferred to be 5 minutes to 75 minutes and more preferred to be 5 minutes to 60 minutes.

A drying step will be illustrated. The flat-sheet membrane after a hydrophilizing treatment using HPC is dried and wound on a roller. The drying condition is preferred to be 40° C. to 70° C. for the temperature and 1% to 20% for the relative humidity so that the moisture is efficiently removed and thermal denaturation of HPC which will be mentioned later is not too much promoted. When the temperature is too high, there is a risk that the thermal denaturation of HPC is too much promoted while, when it is too low, drying becomes insufficient and there is a risk that, during the storage of the membrane after winding, a problem is resulted. When the relative humidity is too high, there is a risk of causing insufficient drying while, when it is too low, there is a risk of causing a big burden in view of energy and equipments.

By continuously carrying out an impregnating step, a fixing step and a drying step as above, there are provided advantages such as enhancement of the productivity and reduction of the cost. Further, the above treatments may be conducted by means of a batch treatment depending upon the production state. In addition, a cross-linking treatment of a hydrophilizing agent and a treating apparatus wherein the membrane and the hydrophilizing agent are made to react and bind may be introduced, if necessary, by means of on-line and it is also possible to conduct a gamma-ray irradiation or a grafting reaction as an after-treatment.

Figure 5:
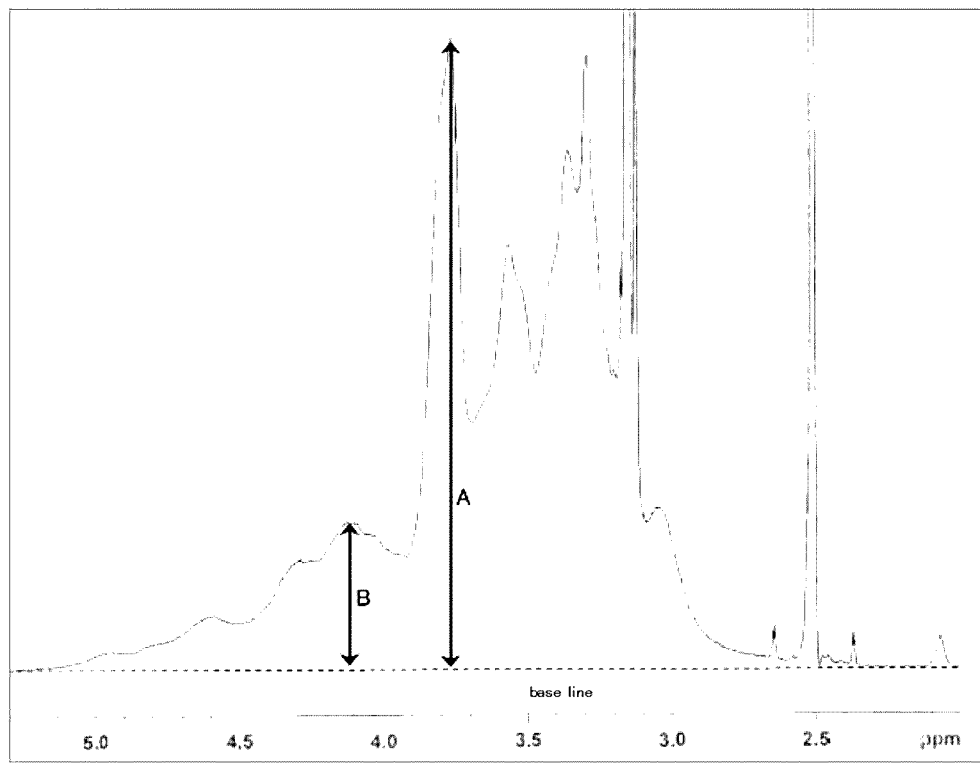
FIG. 5 shows an example of proton NMR spectrum of HPC subjected to heating treatment at 65° C. wherein the intensity of spectral peak at 3.75 ppm is A and the intensity of spectral peak at 4.12 ppm is B.

Then, the changes (thermal denaturation) of HPC on the membrane will be mentioned. With regard to the thermal treatment of HPC, the present inventors have tried to identify the structure of HPC fixed to the membrane using a nuclear magnetic resonance apparatus (proton NMR). FIG. 5 shows an example of the proton NMR spectral chart. It has been found that, when the intensity ratio (B/A, %) of the spectral peak B derived from hydroxyl group appearing near 4.12 ppm is compared using the intensity of a spectral peak A derived from methine group appearing near 3.75 ppm as a standard, there is a correlation between the membrane properties and the intensity ratio. Thus, when the intensity ratio is controlled to 12 to 30%, it is possible to express the fixation to the membrane and the sustainability of the fixation under the state of making the good use of the excellent hydrophilic properties of HPC and, as a result, a flat-sheet membrane exhibiting excellent hydrophilicity and anti-fouling properties for a long period can be prepared. When the intensity ratio is less than 12%, there is a possibility that the hydrophilic properties of HPC contributing to the anti-fouling properties are deteriorated and, as a result, there is a risk that the anti-fouling properties of the membrane lower. On the contrary, when the intensity ratio is more than 30%, fixation of HPC to the membrane is insufficient and, as a result, there is a risk of causing the lowering of hydrophilicity and anti-fouling properties of the membrane. As a result of eager investigations of the present inventors for the condition by which the intensity ratio can be controlled to an appropriate range, it has been found to be preferred as mentioned already that the thermal treatment temperature is made 50° C. to 72° C. and the thermal treating time is made 5 minutes to 75 minutes. As to the reason why the thermal treatment temperature and thermal treatment time as such affect the fixation and the hydrophilic properties of HPC, it is likely that, changes in the structure and the interaction of HPC on the membrane result in the expression of the preferred range of the membrane properties.

After HPC is insolubilized and fixed to the membrane, it is now necessary that the hydrophilicity of HPC is retained. Hydrophilicity of HPC is expressed by such a fact that OH group and —O— group in a HPC molecule have an interaction (hydrogen bond) with water molecules. Insolubilization of HPC is resulted by formation of hydrogen bonds of OH group or —O— group in HPC molecule with OH group or —O— group of the adjacent HPC. The number of hydrogen bonds of HPC molecule with water molecule decreases to such an extent accordingly whereby the hydrophilicity lowers. Thus, even when HPC is insolubilized, hydrophilicity significantly lowers if the heating temperature is high or the heating time is long (in other words, when thermal denaturation is strongly carried out). For a purpose of preparing the hydrogen bond (or achieving the hydrophilicity), conformation of each molecule and group is important. Thus, unless O and H come closer from the predetermined direction, the hydrogen bond is not formed. Since it is affected by the mobility of molecules, "heating temperature and time" become important. For example, even when the heating temperature is within a range by which insolubilization is possible, it is not possible to achieve a molecular configuration suitable for forming a hydrogen bond by an HPC to the adjacent HPC if the heating time is short. The intensity ratio B/A stands for the degree of states of hydrogen bond formation after insolubilization of HPC. Thus, it is a preferred state that HPC molecule forms a hydrogen bond to the adjacent HPC and that the hydrophilicity is retained. Such a state is shown within the above range wherein B/A is 12 to 30%. In order to achieve it, both suitable heating temperature and heating time for HPC are needed.

Figure 6:
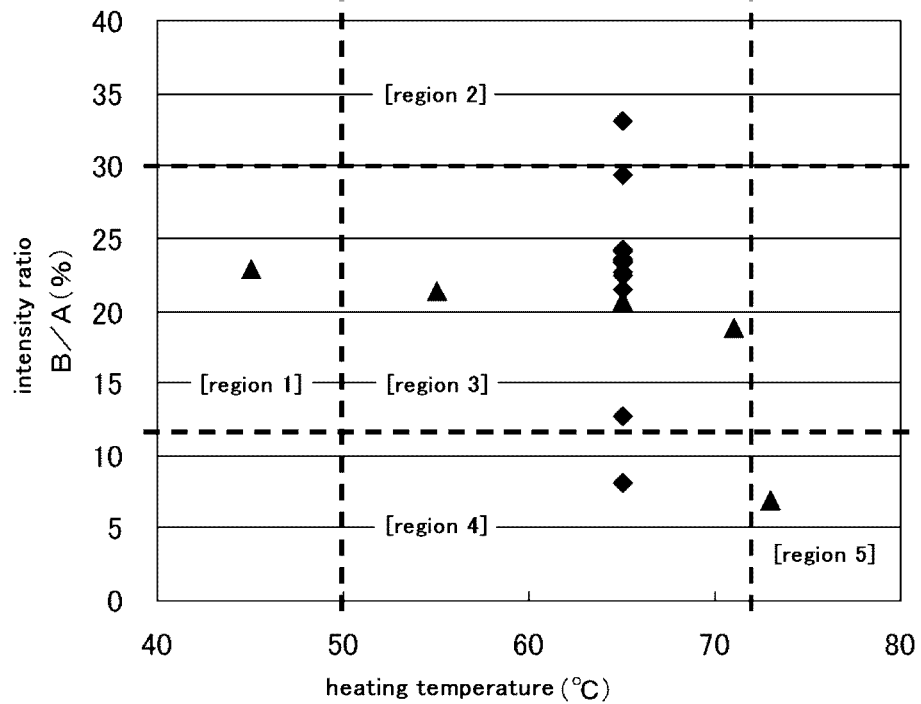
FIG. 6 is a graph which shows a relation between an HPC treatment condition and an intensity ratio (B/A) of spectral peaks (A and B) of proton NMR spectrum chart of HPC.

In view of the above, FIG. 6 of the present application can be divided into the regions 1 to 5 depending upon heating temperature and heating time. The region 1 is a region wherein the thermal treatment temperature is lower than 50° C. and B/A is within 12 to 30%. In this region 1, HPC is not insolubilized because the heating temperature is lower than 50° C. as mentioned above and growth of the gel structure is in an insufficient state. In this region 1, there are such characteristics that (i) the mobility of side chains of HPC is low, (ii) both the main chain and the side chain of HPC exhibit strong interaction to water (hydrogen bond) (solubility is high) and (iii) a part of OH in the side-chain of HPC interacts to the side chain of the adjacent HPC between molecules (NMR peak B (derived from OH) lowers and the B/A value is within the range stipulated by the present application). The region 2 is a region wherein the thermal treatment temperature is 50 to 72° C. and B/A is 30% or more. In this region 2, the heating temperature is 50° C. or higher while the heating time is short whereby there is a characteristic that it is not possible to achieve an appropriate molecular conformation wherein OH of the side chain of HPC results in an interaction with the side chain of the adjacent HPC between molecules. Accordingly, HPC gel structure abundant in the hydrophilicity does not develop whereby HPC is not fixed to the membrane and, with elapse of time, HPC will be detached from the membrane. Incidentally, in the HPC molecule, intramolecular hydrogen bond is detached when temperature is raised over the phase transfer point (insolubilizing point) whereby B/A once becomes big. The region 3 is within such a range that the thermal treatment temperature is 50 to 72° C. and the thermal treatment time is 5 to 60 minutes and B/A is within a range of 12 to 30%. This region 3 is a preferred region of the present invention and is in a state wherein an HPC gel structure abundant in hydrophilicity is formed. In the region 3, there are such characteristics that (i) the mobility of side chains of HPC is enhanced, (ii) the side chain of HPC forms a hydrogen bond with the side chain of the adjacent HPC between molecules using OH group (no hydrogen bond is formed between side chain and main chain) and (iii) hydrogen bonds of —O— of main chain to water molecule are formed (expression of hydrophilicity and expression of anti-fouling properties). The region 4 stands for a region wherein the thermal treatment temperature is 50 to 72° C. and B/A is less than 12%. The region 5 stands for a region wherein the thermal treatment temperature is higher than 72° C. and B/A is less than 12%. The regions 4 and 5 are in such a state wherein an HPC gel structure with poor hydrophilicity is formed. In the regions 4 and 5, the side chain OH of HPC interacts with the main chain (—O—) of the adjacent HPC between molecules and there is a characteristic that the HPC main chain cannot interact with water (lowering in the hydrophilicity and lowering in the anti-fouling properties).

Figure 7:
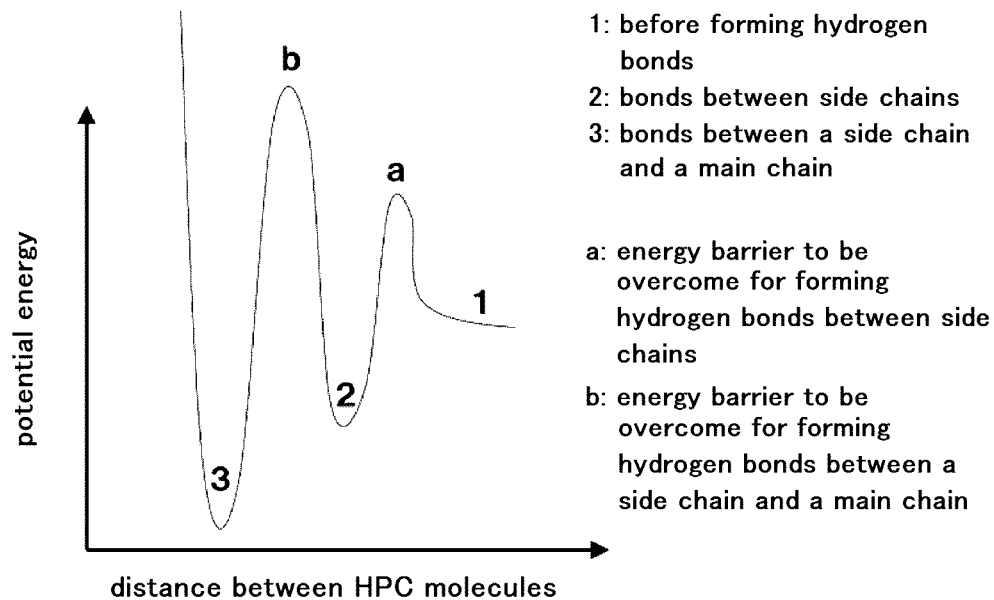
FIG. 7 is a schematic drawing which shows a relation between the distance between HPC molecules and potential energy.

By using the value of the intensity ratio (B/A) of the spectral peak B to the spectral peak A as mentioned above, it is possible to express the bonding state wherein the hydrophilicity of HPC molecules is retained. In order to achieve the bonding state of HPC in each of the regions explained by referring to FIG. 6, there exists the potential energy to be overcome (energy barrier). Relation between the distance between HPC molecules and its potential energy (a schematic drawing) is shown in FIG. 7. As shown in 2 of FIG. 7, the state wherein HPC appropriately forms a hydrogen bond between the side chains is within a range of the B/A value of the present application and 1 and 3 in this graph are the area being apart from the range claimed by the present invention. Further, as shown by a rapid change in the potential energy of FIG. 7, there is resulted a drastic change in the bonding state such as that in the region 3 (Example 5) and that in the region 5 (Comparative Example 4) even if the difference is as small as 2° C. and, as a result, big differences are resulted in thermal denaturation and hydrophilicity.

To sum up, it is necessary that the HPC to be fixed to the membrane is firstly made into gel by being subjected to an insolubilizing treatment at the heating temperature of 50° C. or higher. If the heating temperature is too high or the heating time is not appropriate, the hydrophilicity of HPC is deteriorated. As the state of the thermal denaturation wherein hydrophilicity of HPC is not deteriorated, it is important that the above B/A is within a specific range in view of the bonding state of HPC molecules.

It has been found that even the coating ratio of HPC to the membrane affects the anti-fouling properties of the membrane. Thus, there is an appropriate range in the coating ratio of HPC in order to keep the appearance of hydrophilicity and the anti-fouling effect as long as possible. When the coating ratio is too small, there are resulted such problems that the degree of appearance of hydrophilicity of the membrane probably becomes weak and that the period of keeping the anti-fouling properties of the membrane in actual use becomes short. In addition, when the coating ratio is too big, there is a risk of causing the problems such as that water permeability lowers and pressure loss increases and that, in the use as MBR, the increase rate of trans-membrane pressure difference in the actual use becomes high or it increases within a short period. The coating ratio of hydroxypropyl cellulose of the finally prepared flat-sheet membrane having been subjected to a hydrophilizing treatment is preferred to be 0.4% by weight to 1.0% by weight per each membrane.

In the flat-sheet membrane of the present invention prepared as such, its average pore size being measured by a perm porometer (PPM) manufactured by Porous Materials is 0.2 μm to 0.5 μm. This pore size range is a result of the consideration in fractionation properties and water permeation properties in the practical use. In this PPM measurement, the flow rate when the flat-sheet membrane is in a dry state is 30 L/min to 60 L/min when the pressure is 150 kPa. This range is a result of the consideration in membrane strength and filtering efficiency in a long-term use. The value of the flow rate indirectly expresses the degree of open-pore of the membrane surface and the degree of density of the membrane structure. When the value is larger, there is a tendency that the degree of open-pore of the membrane surface is large or the membrane structure is coarse. On the contrary, when the value is smaller, it can be said there is a tendency that the degree of open-pore of the membrane surface is small or the membrane structure is dense. Since they closely relate to the strength and the filtering efficiency of the membrane, they may be used as an index whether the membrane can be used for a long period.

In the porous polymer membrane constituting the flat-sheet membrane of the present invention, it is preferred that, in an observation of cross sections of the membrane under an electron microscope, a gradually coarse structure exists from the surface contacting the solution to be treated to the inner layer part and that the polymer material constituting the membrane constitutes a three-dimensional mesh on a network whereby it is appropriately entangled with the nonwoven fabric which is a membrane substrate. When the density of the network is too high, water-permeation properties are inhibited while, when it is too low, the membrane component is detached from the substrate in a long-term use whereby there is a risk that its function as a membrane cannot be achieved. FIG. 1(*a*) shows a cross-sectional structure of the membrane prepared by the present invention (Example 1) and FIG. 1(*b*) shows an example of the membrane surface thereof. It can be confirmed from FIG. 1(*a*) and FIG. 1(*b*) that a gradually coarse structure exists from the area near the membrane surface to the inner layer part and, together with entanglement with the membrane substrate, a preferable network is constituted. This is such a membrane structure that a fractionating ability is imparted to the membrane surface part, that permeation of water passing the surface is not inhibited in the inner layer part and that filtration can be effectively conducted.

The initial properties of the flat-sheet membrane can be evaluated by means of pure water flux (FR) and B. P. Pure water flux FR is the volume of pure water which can pass per unit time and per unit area. B. P. is an index showing the maximum pore size of the membrane, and meaning the fractionation properties. The pure water FR (unit: mL/cm$^2$/min/bar) is 15 to 50. When the pure water FR is too small, it is necessary to increase the number of membranes or to increase the pressure by a pump in order to ensure the amount of water supply in an actual use whereby there is a big problem in terms of economy and energy. On the other hand, when the pure water FR is too large, it is necessary to make the pore size of the membrane large whereby fractionation properties become bad and there is a risk that no sufficient function as a membrane can be achieved. B. P. is 0.08 to 0.3 MPa. When the B. P. is too small, the fractionation properties are insufficient (the pore size becomes too big) whereby there is a risk that the sludge component pollutes the filtered water while, when the B. P. is too large, there is a high possibility that no sufficient water permeability can be secured and there is a risk that the efficiency of the filtration becomes poor.

In the flat-sheet membrane of the present invention, thickness of the membrane is preferred to be 80 to 150 μm. Since the shape of the flat-sheet membrane is held by a nonwoven fabric which is a membrane substrate, it is nearly in the same thickness as the membrane substrate. When the thickness is too large, resistance upon passing the water through membrane becomes high whereby there is a risk of lowering the water permeation properties while, when it is too small, there is a possibility that the membrane strength becomes insufficient.

The properties for strength and elongation of the flat-sheet membrane are also basically governed by a nonwoven fabric which is a membrane substrate. When the yield strength is low, plastic deformation is resulted soon after the force is applied to the flat-sheet membrane and does not return to the original state whereby it is preferred to be high. The yield strength of the flat-sheet membrane of the present invention is preferred to be 15 to 52 N per 15 mm width in both the longitudinal direction (MD) and transverse directions (TD). When the yield elongation is large, elongation of the flat-sheet membrane becomes large whereby there is a high risk of breaking the network structure of the flat-sheet membrane and the deformed state is resulted due to hydraulic pressure or to the pressure upon filtration causing a risk that no sufficient water permeability is achieved. In the meantime, when no elongation takes place at all, there is a possibility that, when a mechanical shock is applied to the flat-sheet membrane, it cannot be absorbed but breakage happens. Accordingly, the yield elongation of the flat-sheet membrane of the present invention is preferred to be 1 to 5%. Incidentally, the longitudinal direction of the resulting sheet is called MD.

For the evaluation of the characteristic properties of the flat-sheet membrane of the present invention, a filtration test in the actual liquid using activated sludge is effective. Generally, filtration is continued while retaining a predetermined filtration flow rate, and the increase rate of trans-membrane pressure difference is observed. When the increase rate of trans-membrane pressure difference is kept small during a long period, the membrane is excellent as a membrane for MBR and can be said to be practical. In the present invention, an actual liquid test is conducted under the conditions as shown in Examples and the fact whether the increase of trans-membrane pressure difference on a continuous operation for one week exceeds 10 kPa is taken as an index whether the membrane has the anti-fouling properties.

In the flat-sheet membrane of the present invention, insolubilized HPC is coated on and fixed to a membrane which has been prepared by using, as a membrane substrate, a nonwoven fabric having properties of being durable against the long-term use followed by controlling the membrane structure and the pore size. Accordingly, the sheet is durable against the actual use in the use for MBR and can express the excellent water permeability and also the high hydrophilicity and anti-fouling properties.

EXAMPLES

Excellent effects of the flat-sheet membrane of the present invention will be shown by the following Examples although the present invention is not limited by them. Methods for evaluating the characteristic values measured in Examples will be mentioned as follows.

(1) Used Materials

The materials used in the present invention are as shown below. (Polymer) PVC: TH-700 manufactured by Taiyo Vinyl; CPVC: HA-27F manufactured by Sekisui Chemical; (Solvent): THF manufactured by Mitsubishi Chemical; (Non-solvent): IPA manufactured by Daisho Kasei; 1-BuOH manufactured by Mitsubishi Chemical; (Hydrophilizing agent) HPC: HPC-L manufactured by Nippon Soda; and (Substrate) PET paper: 05TH-60 manufactured by Hirose Seishi.

(2) Pure Water FR

The prepared flat-sheet membrane was cut into a circular shape of 90 mm diameter, set in a holder for filtration (UHP-90K manufactured by Toyo Filter Paper wherefrom a stirrer was eliminated) and subjected to hydraulic pressure of 0.5 bar and then pure water FR was calculated according to the following formula using the amount of permeated water collected in one minute from the outlet of the holder. The water used for the filtration was RO water of 25° C. and the starting time for the collection was after 30 seconds from applying with the hydraulic pressure. Adjustment was conducted to make the height of water level from the membrane surface 3 cm±1 cm.

$$\text{(Pure water } FR[\text{mL/cm}^2/\text{min/bar}]) = (Q[\text{mL/min}])/(A[\text{cm}^2])/(P[\text{bar}])$$

(Q: Amount of permeated water in one minute; A: effective membrane area (=48 cm$^2$); P: hydraulic pressure (=0.5 bar))

(3) B. P.

The prepared membrane was set in a holder used in (2), RO water was added thereto to make its height from the membrane surface 5 cm, pressure of nitrogen was applied from the outlet of the holder (lower (opposite) surface of the membrane) under such a state that a pressure-releasing valve in the holder was open. The pressure at which bubbles continuously go out from the membrane surface into water was taken as B. P. [MPa]. A material which can support the membrane without disturbing the observation of bubbles generating was set over the upper surface of the membrane so that the membrane is not detached from the holder due to the pressure from the lower (opposite) surface. The increase rate of nitrogen pressure was set 0.02 MPa per minute.

(4) Average Pore Size of the Membrane

Figure 2:
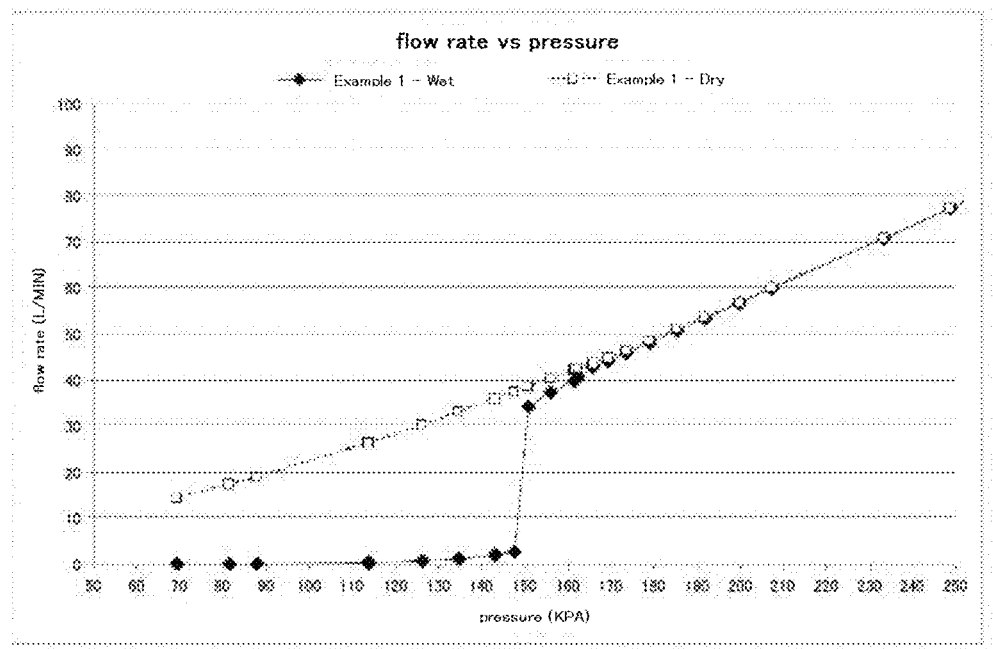
FIG. 2 is a result of measurement of the membrane of Example 1 using a PPM and shows a relation between a pressure (kPa) and a flow rate (L/min).
Figure 3:
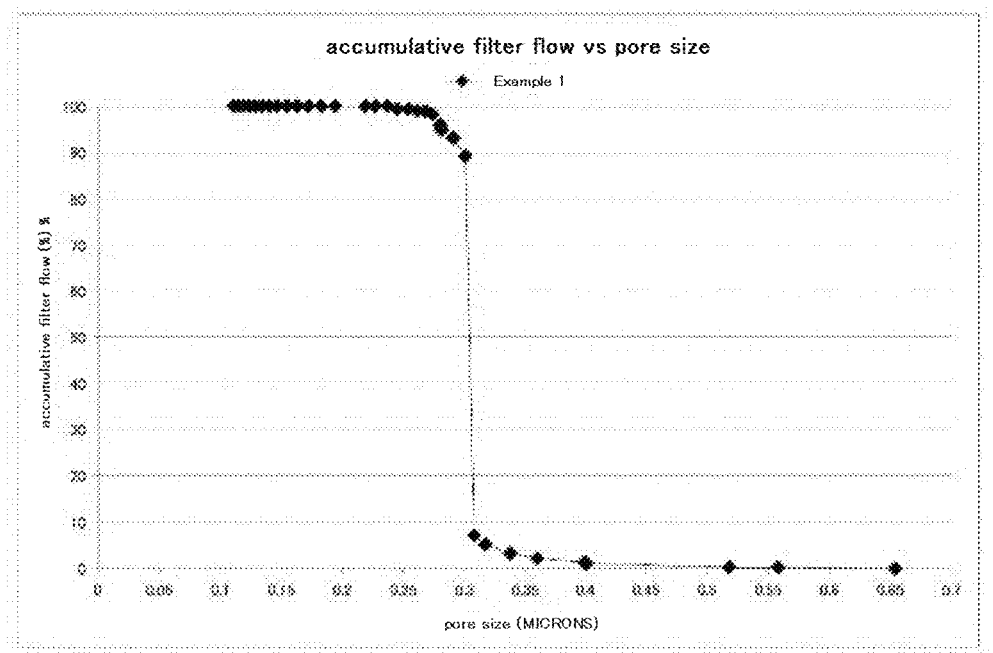
FIG. 3 is a result of measurement of the membrane of Example 1 using a PPM and shows a relation between pore size (μm) and an accumulative filter flow (%).
Figure 4:
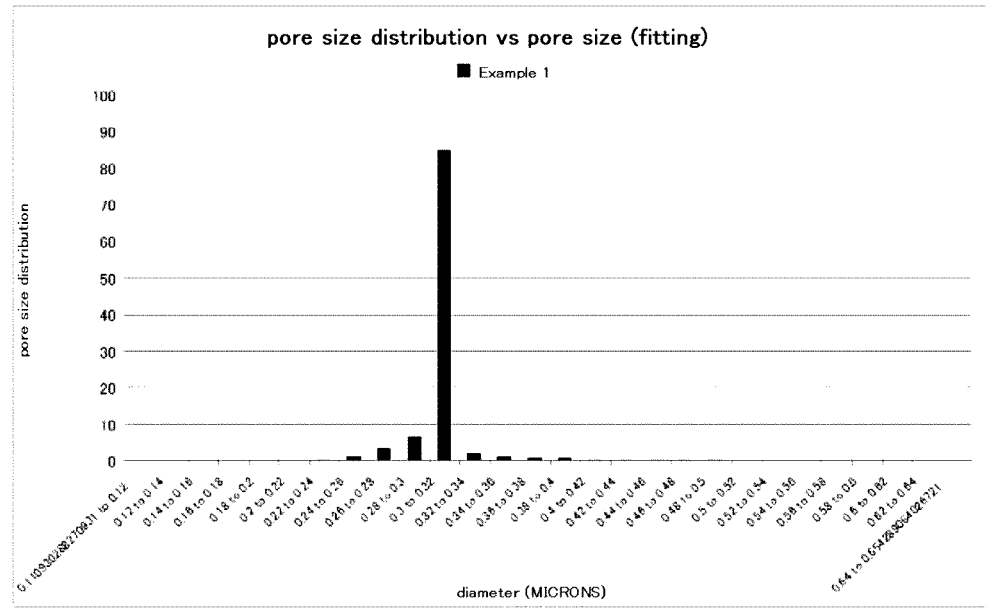
FIG. 4 is a result of measurement of the membrane of Example 1 using a PPM and shows a relation between pore size (fitting, diameter, μm) and pore size distribution (existing ratio, %).

Measurement of average pore size of the prepared membrane was conducted using a perm porometer (PPM, CFP-1200AEX) apparatus manufactured by Porous Materials. A test type was a Wet Up/Dry Up of Capillary Flow Porometory. As a test solution, GalWick (surface tension: 15.7 dynes/cm) was used. A membrane sample was set so as to match a sample holder (inner diameter of O-ring: 30 mm; opening of the holder: 25.4 mm) installed in the apparatus. Measuring parameters as shown below were inputted into the software for the measurement installed in the apparatus. Then, a membrane sample which was well acclimatized by previously immersing in GalWick for 5 minutes was set in a sample holder and then the holder was set in the apparatus. The measurement was firstly conducted under a Wet state and then the measurement under a Dry state was successively conducted. As examples of the result, the relation between the pressure (kPa) and the flow rate (L/min) obtained by the measurement using a membrane sample of Example 1 is shown in FIG. 2, the relation between the pore size (μm) and the accumulated filter flow (%) is shown in FIG. 3 and the relation between the pore size (fitting, diameter, μm) and the pore size distribution (%) is shown in FIG. 4.

<Automatic Test Parameter Values of the Measurement Test for Pore Size Distribution>

Minimum pressure: 0 (kPa), maximum pressure: 30 (kPa)

(i) Bubble point test/integrity test; 10 bublflow (cc/m), 50 F/PT (old bubltime), 0 minbppres (KPA), 0 minbppres (KPA), 1.0 zerotime (sec)

(ii) Motor bubble control; 10 v2incr (cts*3)

(iii) Regulator control; 1 preginc, 2 pulse delay (iv) Lohm's calibration; 1378.9466 maxpres (KPA), 0.2 pulsewidth (sec)

(v) Data setting routine; 30 mineqtime (sec), 10 presslew (cts*3), 50 flowslew (cts*3), 20 eqiter (0.1 sec), 20 aveiter (0.1 sec), 0.69 maxpdif (KPA), 50 maxfdif (cc/m)

(5) Total Thickness of a Flat-Sheet Membrane

With regard to the total thickness of a flat-sheet membrane, randomly chosen five points were measured using a thickness gauge and the mean value thereof was adopted.

(6) Yield Strength and Yield Elongation of a Flat-Sheet Membrane

Yield strength and yield elongation of a flat-sheet membrane were calculated according to the following procedures. Thus, the prepared flat-sheet membrane was cut into a belt shape of 15 mm width (length: ca. 60 mm) and set into a Tensilon (tension measuring apparatus) to make the distance between the chucks 40 mm. Load cell condition was set 100 kgf·range 10% and a tensile test was conducted at a tensile speed of 20 mm/min to give a stress/strain curve. From the resulting curve, tangents of an elastic deformation part and a plastic deformation part are drawn in straight lines, crossing point of both is defined as a yield point and the strength and the yield elongation at that point were determined. Five samples were measured for each of longitudinal and transverse directions of the membrane and the mean values thereof were adopted as yield strength [N/15 mm] and yield elongation [%], respectively.

(7) Thickness of a Membrane Substrate

With regard to the thickness of a membrane substrate, randomly chosen five points of the substrate used for membrane were measured using a thickness gauge and mean values thereof was adopted. Incidentally, there was also conducted another method wherein the flat-sheet membrane was immersed in a solvent which dissolves only membrane components in the flat-sheet membrane so that the membrane components were removed to expose the membrane substrate followed by subjecting to the measurement.

(8) Fiber Diameter of the Membrane Substrate

A picture of the membrane substrate was taken under an SEM and fiber diameter of the membrane substrate was calculated from the photographed substrate fiber and the information for the reduced scale. Calculation was conducted for ten fibers and the mean value thereof was adopted as the fiber diameter [μm] of the membrane substrate.

(9) Basis Weight of the Membrane Substrate Per Unit Thickness

With regard to the basis weight, weight of the substrate cut into 10 cm square was weighed using an electron balance, weight per $m^2$ was calculated from the resulting weight and the resulting basis weight of the substrate was divided by the thickness of the substrate to give the basis weight per μm thickness [$g/m^2/μm$].

(10) Yield Strength and Yield Elongation of the Membrane Substrate

Yield strength and yield elongation of the membrane substrate were measured using Tensilon (tension measuring apparatus). Calculation was conducted in the same manner as in (6) except that a membrane substrate was used instead of a flat-sheet membrane.

(11) Proton NMR Spectrum of HPC

In order to more clearly confirm the thermal denaturation behavior of HPC on a flat-sheet membrane and in order to ensure more sample numbers, the following experiment was carried out. Thus, hydroxypropyl cellulose was homogeneously dissolved in a solution comprising 50/50% by weight of water/2-propanol so as to keep the concentration 1% by weight and each 20 g thereof was placed into three containers. Then each of them was heated for 15 minutes at the condition of 65° C., 71° C. and 73° C. After that, each of them was evaporated to dryness under the condition of not exceeding each of the above temperatures and 10 mg of the resulting HPC was weighed and dissolved in 1 mL of heavy DMSO (DMSO-d6). This was poured into an NMR tube and subjected to a 400-MHz proton NMR measurement. The measuring apparatus used was 400 MR manufactured by Varian. The measuring conditions were that resonance frequency was 399.796 MHz, lock solvent was DMSO-d6, integration frequency was 32 times and waiting time was 1 second. With regard to the standard of chemical shift, the peak derived from DMSO was taken as 2.51 ppm. Analysis of the spectrum was conducted using the analysis software attached to the NMR apparatus. From the resulting spectral chart, the intensity of the spectral peak A appearing at 3.75 ppm was used as a standard and was compared with the intensity of the spectral peak B appearing at 4.12 ppm. To be more specific, base line of the spectral chart was adjusted using the analysis software and, after obtaining the intensity values for the peaks A and B, the intensity ratio B/A (%) was calculated.

(Flat-sheet membrane) Chemical denaturation behavior of HPC attached to the membrane can be checked by the following method. The membrane was immersed in a deuterated methanol which selectively dissolves HPC. Thus, 400 mg of the flat-sheet membrane was weighed and immersed into 1.2 mL of deuterated methanol. Temperature for the extraction was room temperature (ca. 20° C.) and time for the extraction was 48 hours. The resulting extract was poured into an NMR tube and the NMR measurement was conducted. In order to identify the above peaks A and B, a minute amount of DMSO-d6 was poured into the NMR tube. With regard to the measuring condition, the above-mentioned measuring condition was applied except that deuterated methanol was used as a lock solvent and integration frequency was changed to 256 times to conduct the measurement.

(12) Coating Ratio of HPC to the Membrane (i) About 130 mg ($W_1$; the weight was recorded) of the flat-sheet membrane sample was cut into about 1 cm square and placed in a vial bottle in piles. On the other hand, (ii) about 10 mg of HPC was collected ($W_2$; the weight was recorded) and placed in another vial bottle. Into each of those bottles was poured 1 ml of a solution prepared by adding BHT (Butylhydroxy toluene, 3,5-di-tert-butyl-4-hydroxytoluene, 8 mg (D)) as a standard substance to 6 ml of a mixed solution (C) comprising heavy chloroform ($CDCl_3$) and heavy dimethyl sulfoxide (DMSO-d6) in a ratio of 2/1% by volume. The bottles were left for two days for immersion so that the components other than the substrate were dissolved. After that, each of the solutions (i) and (ii) was collected separately and subjected to a 400-MHz proton NMR measurement. The measuring apparatus used was the same as that in (11) and the measuring conditions were that resonance frequency was 399.796 MHz, lock solvent was DMSO-d6, integration frequency was 128 times, waiting time was 1 second and flip angle was 45°. Spectral peak derived from BHT was defined as 6.8 ppm. Attention was paid to it and to another spectral peak derived from HPC appearing near 3.8 ppm. The integral value of the spectral peak derived from BHT and the integral value of the spectral peak derived from HPC in the measurement (i) were defined as I and II, respectively while the integral value of the spectral peak derived from BHT and the integral value of the spectral peak derived from HPC in the measurement (ii) were defined as I' and II', respectively. The coating ratio of HPC per membrane was calculated using the following formula.

<Coating ratio of HPC per membrane=$II \times I' \times W_2/(I \times II' \times W_1) \times 100$[wt %/membrane]>

<Prepared amounts of (C) and (D): When the sample numbers measured at the same time were 6 or more, C and D were defined as follows provided that the measured sample numbers were n.

$C=(n+1)$ [ml]

$D=(n+1)/5 \times 8$ [ml]>

(13) Actual Liquid Test (the Degree of Fouling)

Fouling properties of the membrane were checked using actual sludge solution. As to an apparatus, a test apparatus for membrane bioreactor method of an immersion type (Model IMF-5) manufactured by Miyamoto Seisakusho was used. Activated sludge solution was prepared so as to make the MLSS (Mixed Liquor Suspended Solids) concentration in the apparatus tank about 10,000 mg/L and a membrane cartridge wherein the prepared membrane was adhered to both sides was set. A sucking filtration operation using a tube pump was conducted at a filtration speed of 0.6 m³/day per 1 m² of the membrane area. During the filtration operation, the temperature was kept at 30° C., the operation was not stopped but a continued operation was done and, from the bottom of the tank beneath the membrane cartridge, aeration was conducted continuously. Adjustment was done so as to make the aeration amount 2 L/min per one membrane cartridge. Operation was carried out under this state for one week and the degree of fouling was judged by monitoring the increase of trans-membrane pressure difference. The fact whether the increase for one week was more than 10 kPa was adopted as a standard.

Example 1

A substrate roll comprising the paper manufactured from PET having fiber diameter of 7.1 μm was set on a free roller for unwinding and the substrate was unwound and slowly immersed into an impregnating bath which contains a membrane-preparing solution (7.5% by weight of CPVC, 63.3% by weight of THF, 19% by weight of IPA, and 10.2% by weight of 1-butanol) (retention time: ca. 1 minute). After that, the solvent was evaporated in a drying zone (temperature: 18° C.; relative humidity: 68%; retention time: 5 minutes; being calm without wind) to induce the phase separation whereupon the membrane was prepared. After that, the membrane was slowly wound on a roller using a winding machine to give a hydrophobic porous polymer membrane. Then HPC was applied to the porous polymer membrane. A roll of the porous polymer membrane was set on a free roller for unwinding and was unwound and slowly immersed into an impregnating tank which contains an aqueous alcohol solution comprising HPC (0.7 wt %), IPA (49.65 wt %) and pure water (49.65 wt %) so that no air bubble was included therein. The temperature of the impregnating tank was about 20° C. and the immersing time of the membrane was made 15 minutes. After the membrane was pulled up from the impregnating tank, it was slightly (not longer than 1 second) immersed in a water washing tank which contains pure water. After that, the membrane was immersed for 15 minutes into a hot-water treating tank of 65° C. After the membrane was pulled up from the hot-water treating tank, it was dried in a drying zone under the condition wherein the temperature was 40° C., the relative humidity was 10% and the treating time was 15 minutes. Finally, the membrane was slowly wound on a roller using a winding machine. As such, a hydrophilic membrane (flat-sheet membrane) to which HPC was applied was prepared. Mean pore size of this flat-sheet membrane was 0.3 μm. Details of the substrate, the membrane preparation condition and the after-treatment (hydrophilization) condition were mentioned in Table 1 while details of the membrane properties are mentioned in Table 2.

Example 2

Flat-sheet membrane was prepared under the same condition as in Example 1 except that the HPC concentration of the aqueous alcohol solution was changed to 0.45% by weight. Details of the substrate, the membrane preparation condition and the after-treatment (hydrophilization) condition were mentioned in Table 1 while details of the membrane properties are mentioned in Table 2.

Example 3

Flat-sheet membrane was prepared under the same condition as in Example 1 except that the HPC concentration of the aqueous alcohol solution was changed to 0.95% by weight. Details of the substrate, the membrane preparation condition and the after-treatment (hydrophilization) condition were mentioned in Table 1 while details of the membrane properties are mentioned in Table 2.

Example 4

Flat-sheet membrane was prepared under the same condition as in Example 1 except that the temperature of the hot-water treating tank was changed to 55° C. Details of the substrate, the membrane preparation condition and the after-treatment (hydrophilization) condition were mentioned in Table 1 while details of the membrane properties are mentioned in Table 2.

Example 5

Flat-sheet membrane was prepared under the same condition as in Example 1 except that the temperature of the hot-water treating tank was changed to 71° C. Details of the substrate, the membrane preparation condition and the after-treatment (hydrophilization) condition were mentioned in Table 1 while details of the membrane properties are mentioned in Table 2.

Example 6

Flat-sheet membrane was prepared under the same condition as in Example 1 except that the immersing time into the hot-water treating tank was changed to 6 minutes. Details of the substrate, the membrane preparation condition and the after-treatment (hydrophilization) condition were mentioned in Table 1 while details of the membrane properties are mentioned in Table 2.

Example 7

Flat-sheet membrane was prepared under the same condition as in Example 1 except that the immersing time into the hot-water treating tank was changed to 60 minutes. Details of the substrate, the membrane preparation condition and the after-treatment (hydrophilization) condition were mentioned in Table 1 while details of the membrane properties are mentioned in Table 2.

Example 8

Flat-sheet membrane was prepared under the same condition as in Example 1 except that the polymer for the membrane-preparing solution was changed to PVC. Details of the substrate, the membrane preparation condition and the after-treatment (hydrophilization) condition were mentioned in Table 1 while details of the membrane properties are mentioned in Table 2.

Example 9

Flat-sheet membrane was prepared under the same condition as in Example 1 except that the fiber diameter of the substrate was changed to 5.3 μm. Details of the substrate, the membrane preparation condition and the after-treatment (hydrophilization) condition were mentioned in Table 1 while details of the membrane properties are mentioned in Table 2.

Example 10

Flat-sheet membrane was prepared under the same condition as in Example 1 except that the fiber diameter of the substrate was changed to 11.6 μm. Details of the substrate, the membrane preparation condition and the after-treatment (hydrophilization) condition were mentioned in Table 1 while details of the membrane properties are mentioned in Table 2.

Example 11

Flat-sheet membrane was prepared under the same condition as in Example 1 except that the amount of butanol in the total non-solvent of the membrane-preparing solution was changed to 75% by weight. Details of the substrate, the membrane preparation condition and the after-treatment (hydrophilization) condition were mentioned in Table 1 while details of the membrane properties are mentioned in Table 2.

Example 12

Flat-sheet membrane was prepared under the same condition as in Example 1 except that the amount of butanol in the total non-solvent of the membrane-preparing solution was changed to 25% by weight. Details of the substrate, the membrane preparation condition and the after-treatment (hydrophilization) condition were mentioned in Table 1 while details of the membrane properties are mentioned in Table 2.

Comparative Example 1

Flat-sheet membrane was prepared under the same condition as in Example 1 except that the HPC concentration of the aqueous alcohol solution was changed to 0.3% by weight. Details of the substrate, the membrane preparation condition and the after-treatment (hydrophilization) condition were mentioned in Table 1 while details of the membrane properties are mentioned in Table 2.

Comparative Example 2

Flat-sheet membrane was prepared under the same condition as in Example 1 except that the HPC concentration of the aqueous alcohol solution was changed to 1.2% by weight. Details of the substrate, the membrane preparation condition and the after-treatment (hydrophilization) condition were mentioned in Table 1 while details of the membrane properties are mentioned in Table 2.

Comparative Example 3

Flat-sheet membrane was prepared under the same condition as in Example 1 except that the temperature of the hot-water treating tank was changed to 45° C. Details of the substrate, the membrane preparation condition and the after-treatment (hydrophilization) condition were mentioned in Table 1 while details of the membrane properties are mentioned in Table 2.

Comparative Example 4

Flat-sheet membrane was prepared under the same condition as in Example 1 except that the temperature of the hot-water treating tank was changed to 73° C. Details of the substrate, the membrane preparation condition and the after-treatment (hydrophilization) condition were mentioned in Table 1 while details of the membrane properties are mentioned in Table 2.

Comparative Example 5

Flat-sheet membrane was prepared under the same condition as in Example 1 except that the immersing time into the hot-water treating tank was changed to 2 minutes. Details of the substrate, the membrane preparation condition and the after-treatment (hydrophilization) condition were mentioned in Table 1 while details of the membrane properties are mentioned in Table 2.

Comparative Example 6

Flat-sheet membrane was prepared under the same condition as in Example 1 except that the immersing time into the hot-water treating tank was changed to 120 minutes.

Details of the substrate, the membrane preparation condition and the after-treatment (hydrophilization) condition were mentioned in Table 1 while details of the membrane properties are mentioned in Table 2.

TABLE 1

(substrate and membrane preparation condition)

| [unit] | substrate condition fiber diameter of nonwoven fabric [μm] | membrane preparation condition membrane material (polymer) | amount of butanol in the total non-solvent 1-BuOH/ (IPA + 1-BuOH) [wt %] | after-treatment (hydrophilization) used amount of HPC [wt %] | hot-water treatment temperature [° C.] | time [minute] |
|---|---|---|---|---|---|---|
| Example 1 | 7.1 | CPVC | 35 | 0.7 | 65 | 15 |
| Example 2 | ↑ | ↑ | ↑ | 0.45 | ↑ | ↑ |
| Example 3 | ↑ | ↑ | ↑ | 1.0 | ↑ | ↑ |
| Example 4 | ↑ | ↑ | ↑ | 0.7 | 55 | ↑ |
| Example 5 | ↑ | ↑ | ↑ | ↑ | 71 | ↑ |
| Example 6 | ↑ | ↑ | ↑ | ↑ | 65 | 6 |
| Example 7 | ↑ | ↑ | ↑ | ↑ | ↑ | 60 |
| Example 8 | ↑ | PVC | ↑ | ↑ | ↑ | 15 |
| Example 9 | 5.3 | CPVC | ↑ | ↑ | ↑ | ↑ |
| Example 10 | 11.6 | ↑ | ↑ | ↑ | ↑ | ↑ |
| Example 11 | 7.1 | ↑ | 75 | ↑ | ↑ | ↑ |
| Example 12 | ↑ | ↑ | 25 | ↑ | ↑ | ↑ |
| Comparative Example 1 | 7.1 | CPVC | 35 | 0.3 | 65 | 15 |
| Comparative Example 2 | ↑ | ↑ | ↑ | 1.2 | ↑ | ↑ |
| Comparative Example 3 | ↑ | ↑ | ↑ | 0.7 | 45 | ↑ |
| Comparative Example 4 | ↑ | ↑ | ↑ | ↑ | 73 | ↑ |
| Comparative Example 5 | ↑ | ↑ | ↑ | ↑ | 65 | 2 |
| Comparative Example 6 | ↑ | ↑ | ↑ | ↑ | ↑ | 120 |

TABLE 2

(membrane properties)

| [unit] | thickness of flat-sheet membrane [μm] | pure water FR [mL/cm²/min/bar] | B.P. [MPa] | average pore size by PPM [μm] | flow in a dry state by PPM [L/min@ 150 kPa] | longitudinal direction (MD) yield strength [N/15 mm] | longitudinal direction (MD) yield elongation [%] | transverse direction (TD) yield strength [N/15 mm] | transverse direction (TD) yield elongation [%] | coating ratio of HPC [wt %/membrane] | Increase of trans-membrane pressure difference for one week [kPa] | intensity ratio B/A of NMR peak [%] |
|---|---|---|---|---|---|---|---|---|---|---|---|---|
| Example 1 | 120 | 43 | 0.15 | 0.30 | 39 | 43.1 | 2.4 | 25.6 | 2.3 | 0.69 | 5 | 23.3 |
| Example 2 | 118 | 45 | 0.15 | 0.29 | 42 | 45.3 | 2.4 | 26.8 | 2.2 | 0.41 | 9 | 20.7 |
| Example 3 | 122 | 41 | 0.14 | 0.31 | 40 | 40.1 | 2.4 | 27.2 | 2.3 | 0.98 | 10 | 24.2 |
| Example 4 | 123 | 42 | 0.13 | 0.33 | 44 | 40.8 | 2.3 | 28.5 | 2.1 | 0.68 | 5 | 21.4 |
| Example 5 | 116 | 44 | 0.14 | 0.32 | 42 | 42.4 | 2.5 | 28.3 | 2.5 | 0.75 | 9 | 18.9 |
| Example 6 | 121 | 44 | 0.14 | 0.30 | 39 | 43.5 | 2.3 | 25.4 | 2.2 | 0.70 | 5 | 29.4 |
| Example 7 | 120 | 43 | 0.15 | 0.30 | 39 | 43.6 | 2.4 | 25.6 | 2.3 | 0.96 | 5 | 12.7 |
| Example 8 | 121 | 38 | 0.16 | 0.26 | 34 | 43.0 | 2.5 | 26.7 | 2.4 | 0.65 | 7 | 24.1 |
| Example 9 | 115 | 48 | 0.12 | 0.35 | 45 | 28.5 | 2.3 | 19.6 | 2.0 | 0.71 | 7 | 23.6 |
| Example 10 | 127 | 39 | 0.17 | 0.26 | 36 | 49.8 | 2.5 | 28.5 | 2.2 | 0.73 | 6 | 22.5 |
| Example 11 | 119 | 18 | 0.27 | 0.22 | 30 | 35.7 | 2.2 | 22.1 | 2.0 | 0.83 | 10 | 22.7 |
| Example 12 | 120 | 49 | 0.09 | 0.45 | 59 | 46.1 | 2.6 | 30.4 | 2.5 | 0.53 | 8 | 23.4 |
| Comparative Example 1 | 118 | 49 | 0.12 | 0.33 | 41 | 40.2 | 2.4 | 27.5 | 2.0 | 0.32 | 15 | 21.5 |
| Comparative Example 2 | 121 | 12 | 0.22 | 0.25 | 33 | 43.5 | 2.4 | 26.4 | 2.3 | 1.12 | 17 | 23.3 |

TABLE 2-continued (membrane properties)

| [unit] | thickness of flat-sheet membrane [μm] | pure water FR [mL/cm²/min/bar] | B.P. [MPa] | average pore size by PPM [μm] | flow in a dry state by PPM [L/min@150 kPa] | longitudinal direction (MD) | | transverse direction (TD) | | coating ratio of HPC [wt %/membrane] | Increase of trans-membrane pressure difference for one week [kPa] | intensity ratio B/A of NMR peak [%] |
|---|---|---|---|---|---|---|---|---|---|---|---|---|
| | | | | | | yield strength [N/15 mm] | yield elongation [%] | yield strength [N/15 mm] | yield elongation [%] | | | |
| Comparative Example 3 | 120 | 45 | 0.14 | 0.30 | 38 | 41.0 | 2.3 | 24.5 | 2.1 | 0.35 | 16 | 22.9 |
| Comparative Example 4 | 119 | 40 | 0.16 | 0.27 | 35 | 42.7 | 2.6 | 26.7 | 2.3 | 0.82 | 20 | 6.9 |
| Comparative Example 5 | 121 | 47 | 0.13 | 0.29 | 39 | 43.6 | 2.3 | 25.4 | 2.1 | 0.35 | 17 | 33.1 |
| Comparative Example 6 | 119 | 43 | 0.14 | 0.30 | 40 | 42.3 | 2.4 | 24.9 | 2.2 | 0.76 | 19 | 8.1 |

As it will be apparent from the result of Table 2, membranes having excellent water permeation properties and good B. P. were obtained in Examples 1 to 12. Membrane structure durable for the practical use was also achieved in Examples 1 to 12. Due to the synergism of the membrane structure as such and the HPC coating treatment for the membrane, an excellent result (small increase rate of trans-membrane pressure difference) was achieved in the filtration test using the actual sludge solution in Examples 1 to 12. On the contrary, in Comparative Example 1, the coating ratio of HPC was low, the hydrophilic effect was not fully achieved and the increase rate of trans-membrane pressure difference in the test using the actual liquid was high. In Comparative Example 2, the coating ratio of HPC was too high whereby the pure water FR was low. The increase rate of trans-membrane pressure difference in the test using the actual liquid was also high in Comparative Example 2. In Comparative Example 3, the thermal treatment temperature of HPC was low whereby the fixation to the porous membrane was insufficient, the coating ratio of HPC was low and the increase rate of trans-membrane pressure difference in the test using the actual liquid was high. In Comparative Example 4, the thermal treatment temperature of HPC was too high whereby the thermal denaturation of HPC was too much promoted and the increase rate of trans-membrane pressure difference in the test using the actual liquid was high. Also, intensity ratio (B/A) was small in Comparative Example 4. In Comparative Example 5, the hot-water treating time was too short whereby the fixation of HPC to the porous polymer membrane was insufficient, the coating ratio of HPC was low and the increase rate of trans-membrane pressure difference in the test using the actual liquid was high. Also, the intensity ratio (B/A) was big in Comparative Example 5. In Comparative Example 6, the hot-water treating time was too long whereby the thermal denaturation of HPC was too much promoted and the increase rate of trans-membrane pressure difference in the test using the actual liquid was high. Also, the intensity ratio (B/A) was small in Comparative Example 6.

INDUSTRIAL APPLICABILITY

In the flat-sheet membrane of the present invention, sufficient physical properties durable for a long-time use are achieved while the membrane properties such as water permeability and anti-fouling properties are still excellent. Accordingly, the flat-sheet membrane of the present invention is quite appropriate for the treatment of wastewater.

The invention claimed is:

1. A porous polymer flat-sheet membrane for MBR comprising;
    a hydrophobic porous polymer membrane forming a network structure, and
    a sheet substrate supporting it,
    wherein at least a surface of the hydrophobic porous polymer membrane are coated and fixed with an insolubilized hydroxypropyl cellulose, such that a content ratio of the hydroxypropyl cellulose in the porous polymer flat-sheet membrane is 0.4 to 1.0% by weight and that, when NMR spectrum of the hydroxypropyl cellulose coated on and fixed to the hydrophobic porous polymer membrane is measured using a nuclear magnetic resonance apparatus (proton NMR), an intensity ratio (B/A) of a spectral peak (B) appearing at 4.12 ppm to a spectral peak (A) appearing at 3.75 ppm is 12 to 30%.

2. The flat-sheet membrane according to claim 1, wherein a filter flow in a dry state is 30 to 60 L/min when a pressure is 150 kPa.

3. The flat-sheet membrane according to claim 1, wherein average pore size of the flat-sheet membrane when measured by a perm porometer is 0.2 to 0.5 μm.

4. The flat-sheet membrane according to claim 1, wherein pure water flux is 15 to 50 mL/cm²/min/bar and bubble point is 0.08 to 0.3 MPa.

5. A method for producing the flat-sheet membrane according to claim 1,
    wherein a sheet substrate is impregnated with a membrane-preparation solution containing hydrophobic polymer, solvent and non-solvent followed by drying to form a sheet,
    wherein a porous polymer membrane is formed on and in the sheet substrate,
    then the resulting sheet is successively put into a tank containing hydroxypropyl cellulose in an impregnating step,
    a water washing step in a water washing tank and
    a fixing step in a hot water tank of 50 to 72° C.
    followed by a drying step and
    a time for putting into the hot water tank of 50 to 72° C. is 50 to 75 minutes.

* * * * *